US012752949B2

(12) United States Patent
Baldini et al.

(10) Patent No.: US 12,752,949 B2
(45) Date of Patent: Oct. 6, 2026

(54) MACHINE FOR MAKING CAPSULES

(71) Applicant: I.M.A. INDUSTRIA MACCHINE AUTOMATICHE S.p.A., Ozzano Dell'Emilia (IT)

(72) Inventors: Lorenzo Baldini, Ozzano Dell'Emilia (IT); Sauro Rivola, Ozzano Dell'Emilia (IT)

(73) Assignee: I.M.A. INDUSTRIA MACCHINE, Ozzano Dell'Emilia (IT)

( * ) Notice: Subject to any disclaimer, the term of this patent is extended or adjusted under 35 U.S.C. 154(b) by 161 days.

(21) Appl. No.: 17/626,662

(22) PCT Filed: Jul. 13, 2020

(86) PCT No.: PCT/IB2020/056567
§ 371 (c)(1),
(2) Date: Jan. 12, 2022

(87) PCT Pub. No.: WO2021/024051
PCT Pub. Date: Feb. 11, 2021

(65) Prior Publication Data
US 2022/0250780 A1 Aug. 11, 2022

(30) Foreign Application Priority Data
Aug. 5, 2019 (IT) ........................ 102019000013965

(51) Int. Cl.
*B65B 29/02* (2006.01)
*B65B 1/32* (2006.01)
(Continued)

(52) U.S. Cl.
CPC ................ *B65B 43/52* (2013.01); *B65B 1/32* (2013.01); *B65B 29/022* (2017.08); *B65B 43/54* (2013.01);
(Continued)

(58) Field of Classification Search
CPC .... B65B 29/022; B65G 17/007; B65G 47/52; B65G 62/02; B65G 54/02
(Continued)

(56) References Cited

U.S. PATENT DOCUMENTS 6,752,258 B2 * 6/2004 Ludwig .................. B65G 35/06 198/463.3
8,813,940 B2 * 8/2014 Junk ....................... B65B 43/52 198/339.1
(Continued)

FOREIGN PATENT DOCUMENTS

CN 204568073 U 8/2015
CN 105416621 A 3/2016
(Continued)

OTHER PUBLICATIONS

Chinese Office Action dated Dec. 2, 2022 from counterpart Chiinese Patent Application No. 202080055840.1.
(Continued)

*Primary Examiner* — Shelley M Self
*Assistant Examiner* — Patrick B Fry
(74) *Attorney, Agent, or Firm* — SHUTTLEWORTH & INGERSOLL, PLC; Timothy J. Klima

(57) ABSTRACT

A machine for making capsules containing powder product which includes a plurality of processing stations, which are configured to perform respective processes for making capsules containing powder product in a respective predetermined processing time. The machine also includes movement means configured for conveying the capsules along a processing path extending through the plurality of processing stations. In particular, the movement means include a plurality of units each designed to each receive at least one capsule body, and at least one guide rail extending along the processing path and define with each unit a linear motor.

15 Claims, 4 Drawing Sheets

(51) Int. Cl.

| | |
|---|---|
| ***B65B 43/52*** | (2006.01) |
| ***B65B 43/54*** | (2006.01) |
| ***B65B 57/00*** | (2006.01) |
| ***B65B 65/00*** | (2006.01) |
| ***B65G 17/00*** | (2006.01) |
| ***B65G 47/52*** | (2006.01) |
| ***B65G 54/02*** | (2006.01) |

(52) U.S. Cl.
CPC ............ *B65B 57/00* (2013.01); *B65B 65/003* (2013.01); *B65G 54/02* (2013.01)

(58) Field of Classification Search
USPC ...................................... 198/463.3, 797, 795
See application file for complete search history.

(56) References Cited

U.S. PATENT DOCUMENTS

| | | | | |
|---|---|---|---|---|
| 9,346,576 | B2 * | 5/2016 | Allgaier | B65B 35/00 |
| 9,708,086 | B2 * | 7/2017 | Bianchi | B65B 29/02 |
| 10,246,204 | B2 * | 4/2019 | Rea | B65B 65/003 |
| 11,091,284 | B2 * | 8/2021 | Nakamoto | B65B 43/52 |
| 11,281,172 | B1 * | 3/2022 | Kalm | B65B 43/42 |
| 2017/0225814 | A1 | 8/2017 | Eberhardt et al. | |
| 2019/0233152 | A1 * | 8/2019 | Nakamoto | B65B 51/32 |
| 2020/0290797 | A1 * | 9/2020 | Steffen | B65B 61/20 |
| 2021/0061506 | A1 * | 3/2021 | Pickett | B65B 5/105 |

FOREIGN PATENT DOCUMENTS

| | | | |
|---|---|---|---|
| EP | 2810878 | A1 | 12/2014 |
| WO | 2015011657 | A1 | 1/2015 |
| WO | 2016200752 | A1 | 12/2016 |

OTHER PUBLICATIONS

International Search Report and Written Opinion dated Sep. 21, 2020 from International Patent Application No. PCT/IB2020/056567.

* cited by examiner

MACHINE FOR MAKING CAPSULES

This application is the National Phase of International Application PCT/IB2020/056567 filed Jul. 13, 2020, which designated the U.S.

This application claims priority to Italian Patent Application No. 102019000013965 filed Aug. 5, 2019, which application is incorporated by reference herein.

TECHNICAL FIELD

This invention relates to the technical sector of packaging of single-use containers containing a dose of preparation for food products (in particular for beverages), for example pods or capsules for coffee, tea or other preparations for extraction.

In particular, the invention relates to a machine and a method for making capsules containing powder product.

BACKGROUND ART

The diffusion of single-use capsules and pods in particular for extraction beverages is in continuous expansion thanks to the speed, convenience and simplicity of use of these type of products, which are particularly appreciated for their efficiency and speed of use in working environments and used increasingly also in domestic environments.

The increasing demand has therefore made it necessary to continuously optimise the production processes, in particular with regard to a reduction in the processing times necessary for making the finished product.

In the prior art production plants, the capsules during production are moved through a succession of processing stations, each of which is designed to perform a specific procedure, such as, for example, the insertion of a product inside the capsule, the introduction of further elements, the application of a closing cover or the like.

It is evident from the wide variety of possible processing processes which can be performed that each of them may require specific times which do not necessarily coincide with those of the other processes; it is therefore inevitable that inside the machine designed for making the capsules there are stations which take longer than others for processing the capsules.

The above means that in the time during which the slower stations process a certain number of capsules the faster stations process a greater number of capsules, therefore causing the occurrence of bottlenecks at the infeed to the slower stations which receive too many capsules, therefore slowing down the production, or generating an adequate feeding in the faster stations which receive too few and whilst waiting remain stationary, thus wasting machine time, that is, productivity.

AIM OF THE INVENTION

In this context, the technical purpose which forms the basis of the invention is to propose a machine and a method for making capsules which overcomes at least some of the above-mentioned disadvantages of the prior art.

In particular, the aim of the invention is to provide a machine and a method for making capsules which are able to render more efficient the process for moving the capsules along a processing path which passes through the various stations, in such a way as to guarantee at any time the feeding to each station of the exact number of capsules which the station is able to process.

The technical purpose indicated and the aims specified are substantially achieved by a machine and a method for making capsules comprising the technical features described in one or more of the accompanying claims.

This invention describes a machine for making capsules containing powder product which comprises a plurality of processing stations configured for performing respective processes for making capsules containing powder product in a respective predetermined processing time and movement means configured for conveying the capsules along a processing path which extends through the plurality of processing stations.

The movement means comprise a plurality of units each designed to each receive at least one capsule body, and at least one guide rail extending along the processing path and defines with each unit a linear type motor.

Advantageously, the particular type of coupling existing between each unit and the guide rail allows the individual units to be moved in an efficient manner and independent from each other.

The invention also relates to a method for making capsules containing powder product which comprises conveying in a mutually independent manner a succession of units, each of which is designed to receive at least one capsule body along a processing path which extends through a plurality of processing stations using a guide rail which defines with each unit a linear type motor.

Preferably, the method also comprises:

- placing at least one capsule body on a respective unit in a first processing station;
- dosing a powder product and inserting it in the at least one capsule body in a second processing station;
- making a dosing cover applying it to a respective capsule body in a third processing station;
- sealing the dosing lid to the respective capsule body in a fourth processing station.

Advantageously, the steps described in the method herein allow the process for feeding the capsules to the individual processing stations to be optimised, preventing the occurrence of bottlenecks and guaranteeing that at any time each processing station is fed with the exact number of capsules which it is able to process, maintaining high quality standards without wasting machine time, that is, maximising productivity.

The dependent claims, incorporated herein for reference, relate to different embodiments of the invention.

BRIEF DESCRIPTION OF THE DRAWINGS

Further features of the invention and its advantages are more apparent in the non-limiting description below, with reference to a preferred but non-exclusive embodiment of a machine for making capsules, as illustrated in the accompanying drawings, in which.

DETAILED DESCRIPTION OF PREFERRED EMBODIMENTS OF THE INVENTION

In the accompanying drawings, the numeral 1 denotes generically a machine for making capsules "C" containing powder product "R", indicated below simply as the machine 1.

The machine according to the invention comprises a plurality of processing stations 2 and movement means 3 configured for conveying the capsules "C" during processing through the various processing stations 2.

By way of example, the capsules "C" may comprise a capsule body made by moulding a metallic material, in particular aluminium or an aluminium alloy.

Figure 1:
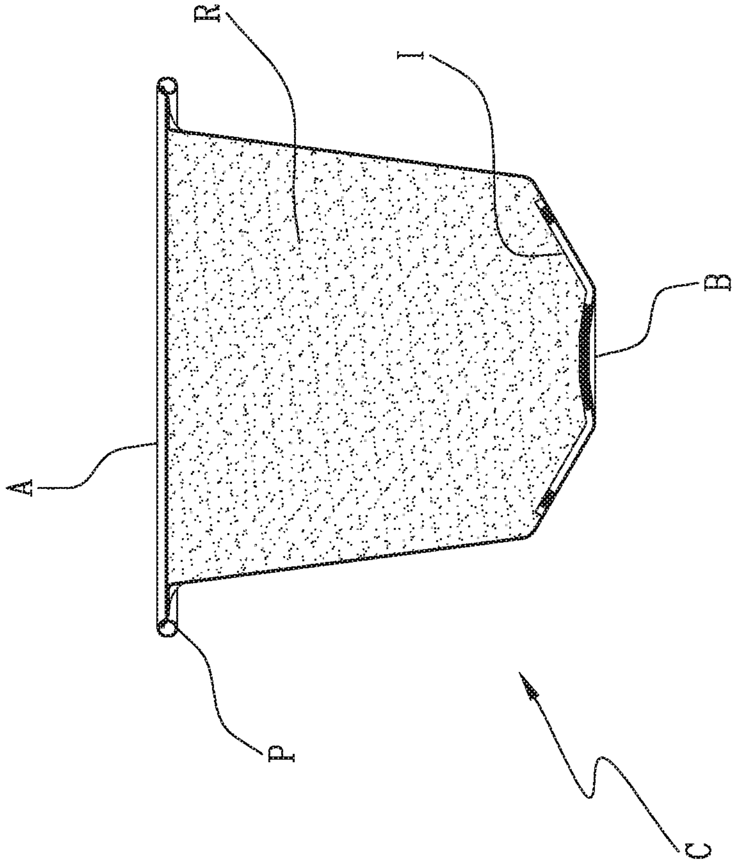
FIG. 1 shows the capsule which can be processed using the machine and/or the method according to the invention.

As may be seen in FIG. 1 (which illustrates a capsule by way of a non-limiting example), the capsules "C" may have the shape of a substantially frustoconical hollow revolved solid, with slight taper and vertex positioned at the bottom, closed at the bottom by a circular base "B", equipped at the top with a circular opening "A", and equipped with an edge wall "P" defined by a circular crown lying horizontally.

It should be noted, more generally speaking, that the invention is applicable to any type of capsule, even of a type not illustrated.

One or more inserts "I" may also be inserted inside the capsule "C".

In general, the processing stations 2 are configured to perform respective processes aimed at making capsules "C" containing powder product "R" in a respective predetermined processing time.

In other words, each processing station 2 is characterised by a relative processing time, which may be different from that of at least one other processing station 2, identifying the duration of the process which it is designed to perform and, therefore, the time for which the capsule "C" must be retained for being correctly processed.

For example, the machine 1 may comprise a plurality of processing stations 2 comprising at least one between: a feed station configured for feeding the capsule bodies to the respective units 4; a dosing and filling station wherein the powder product "R" is dosed and introduced inside the capsule body; a station for making a closing cover, and a sealing station wherein the cover is fixed stably to the capsule body.

The plurality of processing stations 2 may also comprise at least one weighing station, wherein a qualitative check may be performed on the capsules "C" produced or during production, and/or at least one insertion station configured for applying to the capsule body a respective insert "I", such as, for example, an insert made of filtering material.

The movement means 3 are, on the other hand, configured for conveying the capsules "C" along a processing path extending through the plurality of processing stations 2.

In other words, the processing path extends at the machine 1, in such a way as to allow each capsule "C" to be transported to or also inside the various processing stations 2 to allow the latter to operate on them.

Structurally, the movement means 3 comprise a plurality of units 4 each designed to receive at least one capsule body "C", and at least one guide rail 5 extending along the processing path.

In particular, each unit 4 forms with the guide rail 5 a linear type motor.

According to a first embodiment, the guide rail 5 defines the stator of a motor and it may be made, for example, with a succession of electrical elements which can be magnetised (electromagnets) whilst each unit 4 comprises one or more magnets (permanent).

The electrical elements which can be magnetised (electromagnets) of the guide rail 5 are configured to generate a magnetic field which induces in the magnets of the units 4, according to the Faraday law, an electric current which acts by repelling the inducing field.

According to an alternative embodiment, the guide rail 5 may, for example, be made with a succession of fixed conducting elements such as rings, solenoids or simple pieces of metal, whilst each unit 4 comprises one or more electromagnets configured to generate a magnetic field which induces in the conductors of the guide rail 5, according to the Faraday law, an electric current which acts by repelling the inducing field.

This interaction generates a force which makes it possible to move the respective unit 4 along the processing path.

Advantageously, each unit 4 can therefore be controlled independently since it defines with the guide rail 5 an independent and autonomous linear motor which can therefore be moved without being constrained by the movement of the other units 4 forming part of the movement means 3.

Figure 2:
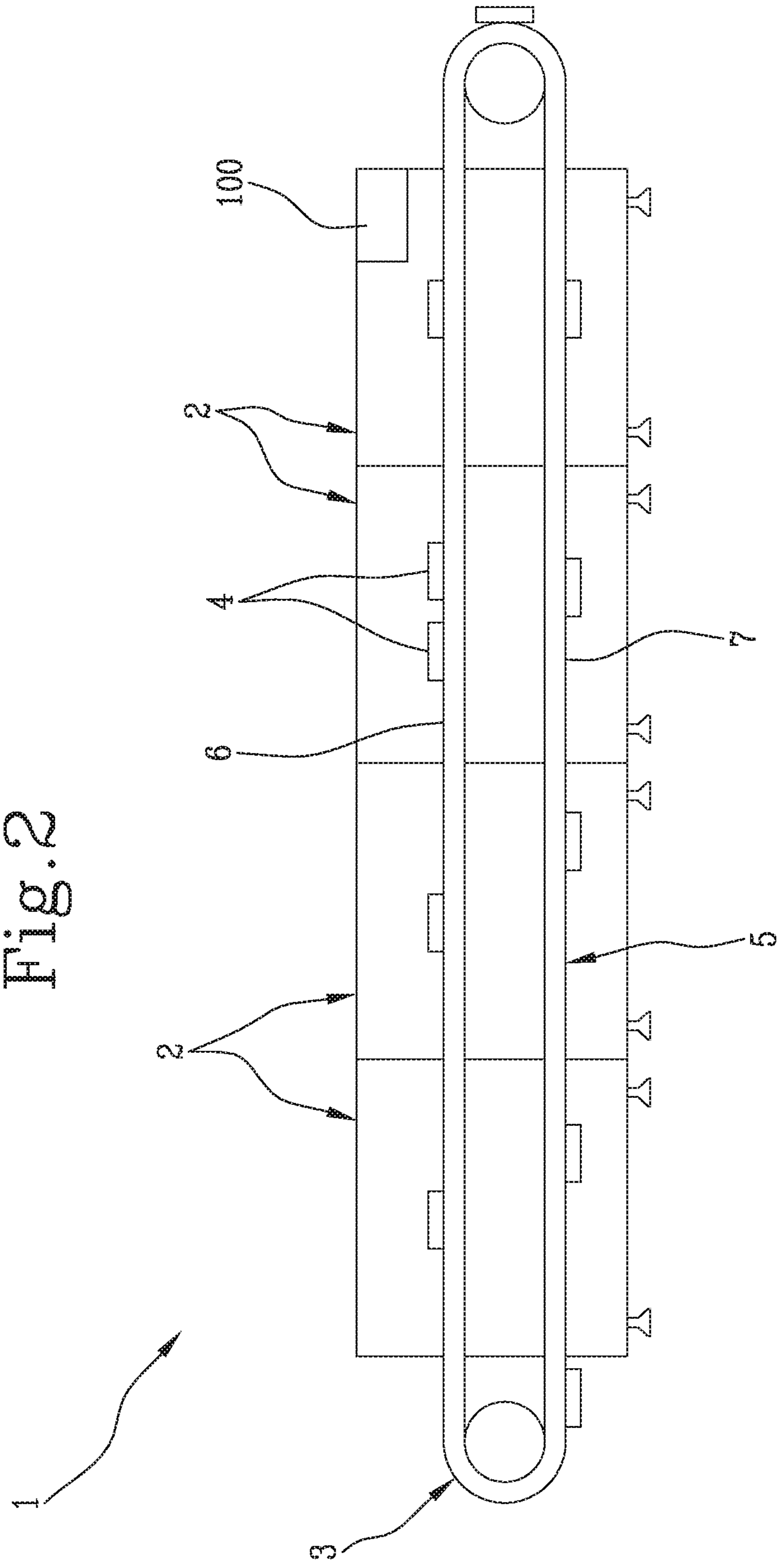
FIG. 2 shows a machine for making capsules according to a possible embodiment.

According to a first possible embodiment, shown schematically in FIG. 2, the guide rail 5 defines a closed path which has an outward section 6 facing the plurality of processing stations 2 along the processing path and a return section 7.

Preferably, the return section 7 is positioned below the forward section 6, in such a way as to optimise the use of the spaces, reducing the overall dimensions of the guide rail.

Alternatively, it is possible to position the return section 7 alongside the forward section 6, or in any case located at the same position as the forward section 6.

In this way, once the capsule bodies have passed through all the processing stations 2 of the machine 1, and the process for making the capsules "C" has been completed, it is possible to extract them from the respective units 4 returning the latter to the start of the processing path, where they can receive further capsule bodies which will in turn be processed by the machine 1.

Figure 3:
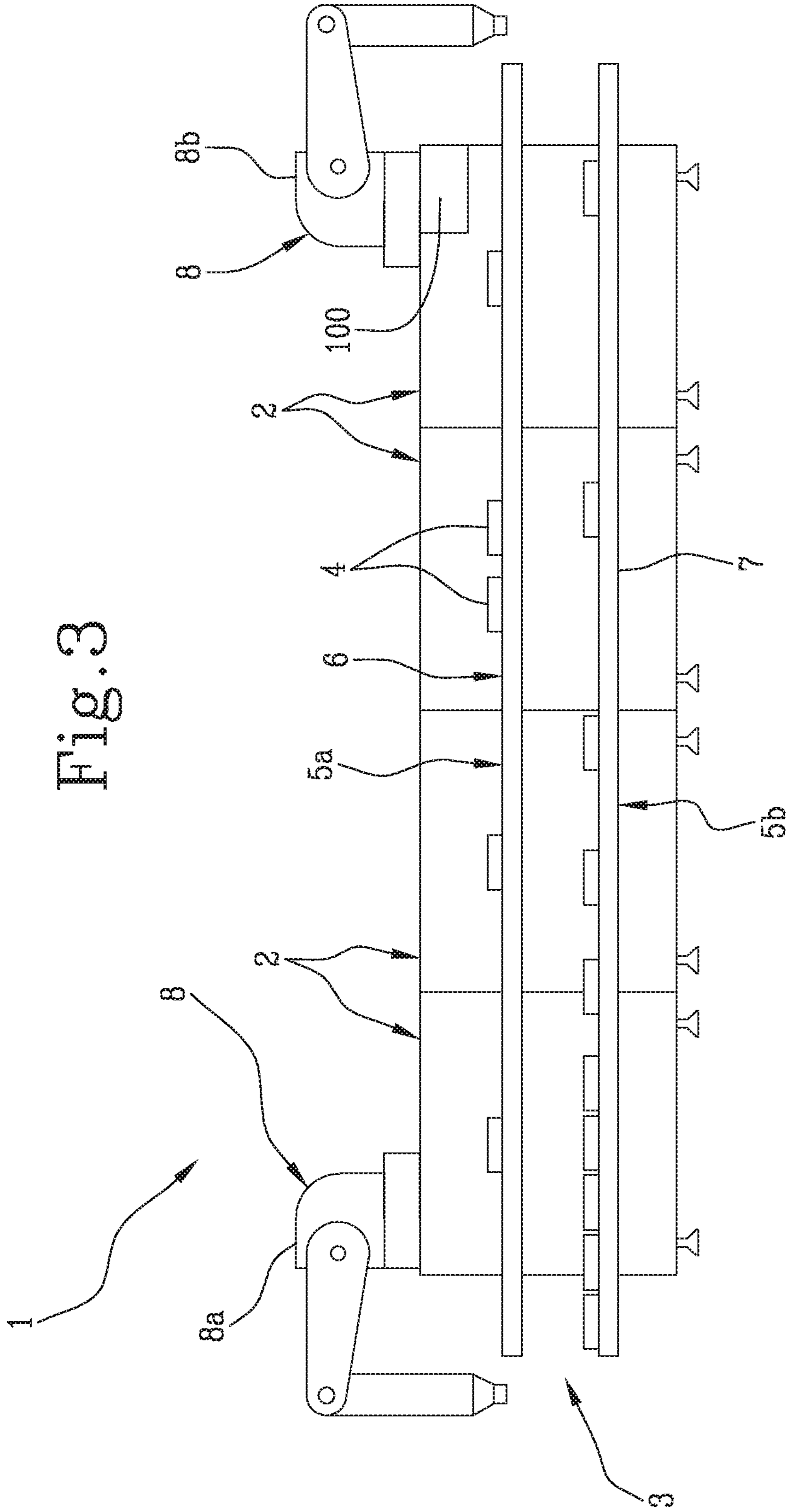
FIG. 3 shows a machine for making capsules according to a further possible embodiment.

According to a second possible embodiment, shown schematically in FIG. 3, the movement means 3 comprise a first guide rail 4*a* which defines a forward section 6 for the units 4 and a second guide rail 5*b* which defines a return section 7 for the units 4.

In particular, the first guide rail 5*a* is positioned at the plurality of stations 2 along the processing path, whilst the second guide rail 5*b* is positioned at the first guide rail 5*a*, preferably below it.

In this case, too, it is also possible to position the return section 7 alongside the forward section 6, simply positioning the second guide rail 5*b* alongside the first guide rail 5*a* or in any case placing it at the same position.

In accordance with this aspect, the movement means 3 also comprise at least one actuator device 8 configured for moving the units 4 from the first guide rail 5*a* to the second guide rail 5*b* and vice versa.

In particular, the at least one actuator device 8 is designed to move from the first guide rail 5*a* to the second guide rail 5*b* the units 4 which have passed through the entire processing path and the capsule bodies of which have undergone all the processes of the various processing stations 2 forming part of the machine 1, in such a way that the units 4 can be moved along the return section.

The at least one actuator device 8 is also configured for moving the units 4 from the second guide rail 5*b* to the first guide rail 5*a*, in such a way as to feed the units 4 to the forward section along which the units 4 will pass through all the various processing stations 2 of the machine 1.

Preferably, the at least one actuator device 8 comprises a first robotic arm 8*a* positioned at an initial section of the processing path, which will coincide with an initial section of the first guide rail 5*a* and with a final section of the second guide rail 5*b*, and a second robotic arm 8*b* positioned at a final section of the same processing path, which will consequently coincide with a final section of the first guide rail 5*a* and with an initial section of the second guide rail 5*b*.

In particular, the robotic arms 8*a*, 8*b* are equipped with manipulators which are able to engage and grip the units 4 and then move them for transferring them from one guide rail to the other.

Moreover, the machine 1 comprises a control unit 100 which is connected to each unit 4 and is active on them for controlling the movement, for example modulating the magnetic field which each of them is able to generate (that is, the magnetic field acting on them).

In accordance with one aspect of the invention, the control unit 100 is configured for actuating each unit 4 in such a way as to feed to each processing station 2 a respective predetermined number of units 4 in such a way as to be able to subject them to the same processes simultaneously.

In other words, the control unit 100 controls the movement of the units 4 in such a way that each processing station 2 can receive exactly the quantity of units which it is designed to process.

In particular, the predetermined number of units 4 to be fed to each processing station 2 is determined as a function of the processing time of the specific processing station 2 and/or as a function of a number of capsules "C" which it is able to process simultaneously.

In this way it is possible to optimise the entire processing process, since each station will receive as input the exact number of units 4 on which it can operate in a given time interval, avoiding the occurrence of bottlenecks or the waste of machine time.

For example, the control unit 100 may be configured for feeding to a processing station 2 which has a processing time greater than that of each other processing station 2 of the machine 1 a number of units 4 greater than that fed to each other processing station 2.

Thus, more generally speaking, the units 4 are moved at a variable speed along the sections between the various processing stations 2.

In this way, in a given time interval, the slower processing stations 2 will be able to process a number of capsules "C" equal to that of the faster processing stations 2.

It follows that in the faster processing stations 2 the processing of the capsules "C" will occur in a mainly sequential manner, that is to say, they will process, for example, a single unit 4 at a time, whilst in the slower stations the processing will occur in a mainly parallel manner, that is to say, they will process several units 4 at a time, increasing in number in proportion to the specific processing time of the processing station 4.

Advantageously, the invention achieves the preset aims overcoming the drawbacks of the prior art by providing the user with a machine for making capsules which is able to move in an autonomous and particularly efficient manner the individual units 4 (and therefore a predetermined number of capsules "C"), thus allowing the exact number of capsules "C" which it is able to process to be selectively fed to each processing station 2.

This prevents the occurrence of bottlenecks at the inlet to the processing stations 2 or the occurrence of situations in which not enough capsules "C" are fed to a predetermined processing station 2, thereby wasting machine time.

The invention also relates to a method for making capsules containing powder product, which can be preferably performed using a machine 1 made as described above.

The method comprises conveying in a mutually independent manner a succession of units 4, each of which is designed to receive at least one capsule body.

In particular, the units are conveyed along a processing path which extends through a plurality of processing stations 2 using a guide rail 5 which defines in combination with each of the units 4 a linear type motor.

Along the processing path the units 4 are then made to pass through the various processing stations 2 in such a way that the capsule bodies can be processed for making the capsules "C".

In particular, the making of the capsules "C" starts by positioning at least one capsule body in a respective unit 4 inside a first processing station 2*a*.

Subsequently, in a second processing station 2*b*, a powder product "R" is dosed and at least one capsule body is filled with the powder product "R".

In other words, at the second processing station 2*b* the product which it must contain is introduced inside the capsule body after it has been dosed in such a way as to ensure that a correct quantity of powder product "R" is used.

At a third processing station 2*c*, on the other hand, a cover is made for closing the capsule body, then it is applied to it.

Lastly, in a fourth processing station 2*d*, the closing lid is sealed to the respective capsule body.

It should be noted that, according to an embodiment, the making of the cover for closing the capsule body and application to the capsule body and the relative sealing of the cover to the capsule body may occur in a single (same) station.

In other words, in this embodiment, the third processing station 2*c* and the fourth station 2*d* can be grouped together in the same station.

The method may also comprise further different steps aimed at making specific capsules "C" which require specific embodiments.

For example, the method may comprise a step of inserting an insert "I", preferably an insert made of filter material, inside the capsule body at a fifth processing station, not illustrated in the accompanying drawings.

Moreover, in order to check that the capsules "C" have been made correctly and that the product can be effectively marketed, it is possible to weigh the capsule body in a sixth processing station 2*e*, in such a way as to check that a correct quantity of powder product has been inserted in it, or that other irregularities have not occurred (failure to apply the insert, the closing cover or incorrect application thereof).

It is also possible that one or more processing stations 2 coincide and therefore one or more operations are performed without the need to move the units 4 between one operation and the next.

In particular, it is possible that the sixth station 2*e* in which the weighing occurs is performed is made inside another processing station 2 in such a way as to check that its working process is performed correctly immediately at the end of it.

In general, the number of units 4 fed at the inlet to each processing station 2 is different to the number of units 4 fed at the inlet to at least another processing station 2.

In other words, the method comprises feeding at the inlet to each processing station 2, using the movement means 3, a specific number of units 2 which differs between the various processing stations 2 as a function of their predetermined processing time.

In particular, preferably, the number of units fed at each processing station 2 is directly proportional to the duration of the respective processing time; processing stations 2 characterised by longer processing times will therefore receive at the inlet a greater number of units 4 than processing stations 2 characterised by shorter processing times.

Moreover, the number of units 4 subjected to a process in each processing station 2 may be different to the number of units 4 subjected to a different process in at least one other processing station 2.

Similarly to what is described with regard to the feeding process, the number of units 4 subjected at a given moment to processing inside a given processing station 2 is established as a function of the respective predetermined processing time.

In other words, the slower processing stations 2 compensate for the long duration of the processing time by processing simultaneously a greater number of units 2, whilst the faster processing stations 2 will process, for example, individually a succession of units 4 in sequence.

It should be noted that there might be any number of units 4 simultaneously processed in each processing station (on the basis of the cycle times of each station).

For example, by way of a non-limiting example, the second station 2*b* and the third station 2*c* could each simultaneously process two units 4, whilst the fourth station 2*d* could process 3 units.

Once the production process has been completed, the method comprises unloading each capsule body from the respective unit 4, at a final section of the processing path, in such a way that the capsule "C" just produced can be fed to further processes downstream, such as, for example, processes for packaging the capsules "C".

The units 4 from which the capsule bodies have been extracted are then carried from the final section to an initial section of the processing path, which is preferably located at the first processing station 2*a*.

FIGS. 4A-4F schematically show several successive time intervals of a possible operating configuration of the method according to the invention.

Figures 4A, 4B, 4C, 4D, 4E, 4F:
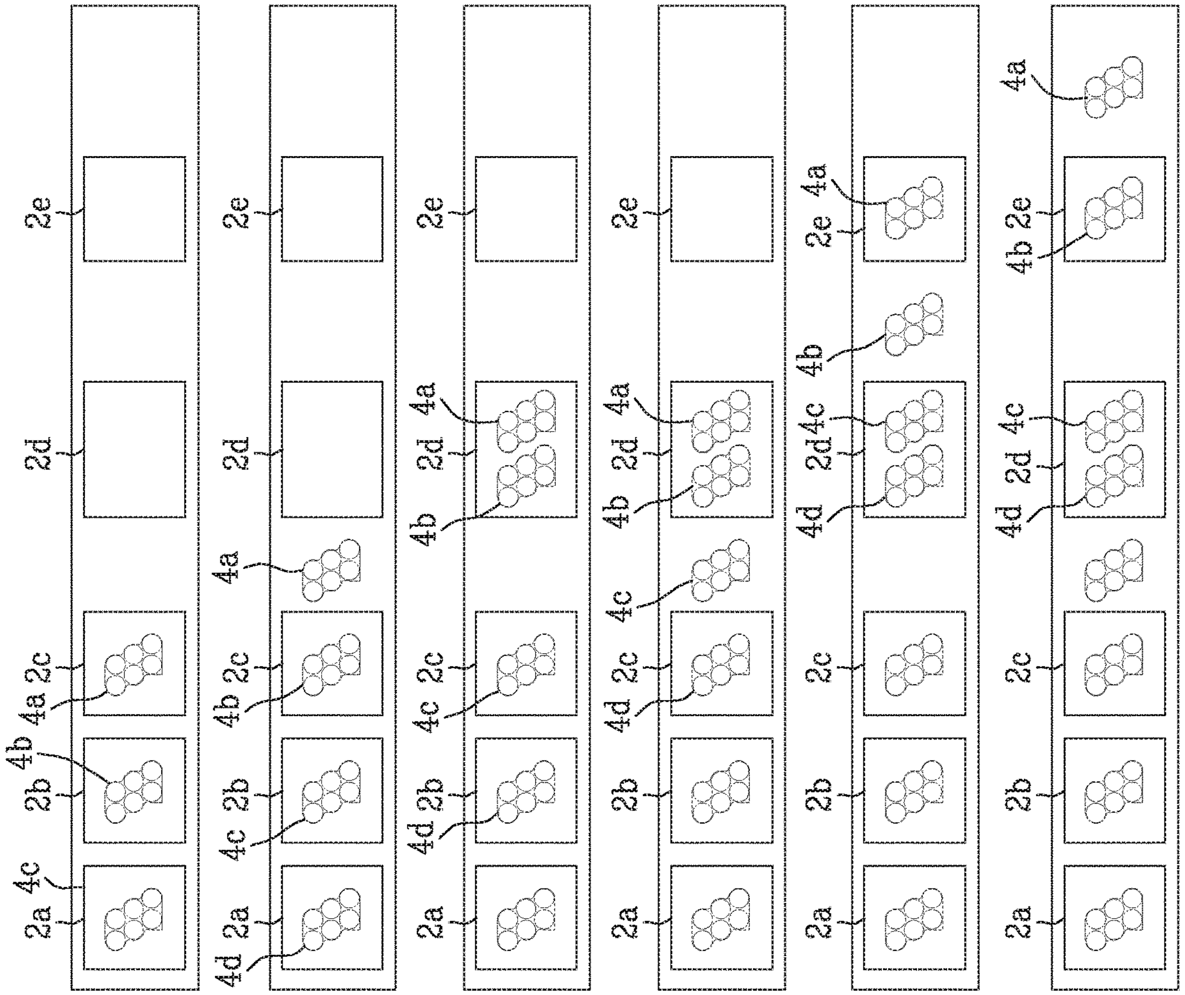
FIGS. 4A-4F schematically show some steps of a possible execution of a method for making capsules according to the invention.

In particular, FIGS. 4A-4B each represent separate successive time intervals wherein the first, second, third and sixth processing stations 2*a*, 2*b*, 2*c*, 2*e* are able to perform the respective process in a predetermined processing time equal to the time interval shown, whilst the fourth processing station 2*d*, which corresponds in the example proposed for the station wherein the closing cover is sealed to the capsule body, is able to perform the respective processing process in a predetermined processing time equal to the twice the time interval shown.

In FIG. 4A, the first three processing stations 2*a*, 2*b* and 2*c* are each processing a first unit 4*a*, a second unit 4*b* and a third unit 4*c* operating on each of the capsule bodies contained therein.

In FIG. 4B, the first unit 4*a* is waiting for the inlet of the fourth processing station, whilst the second and the third units 4*b*, 4*c* are both fed to the respective subsequent processing station 2*b*, 2*c* and a fourth unit 4*d* is fed to the inlet of the first processing station 2*a*.

In FIG. 4C, the first and the second units 4*a*, 4*b* are fed to the fourth processing station 2*d* which will take twice as long as the other processing stations 2 for processing them, simultaneously, the third and the fourth units 4*c*, 4*d* have both been fed to the next processing station 2*b*, 2*c* relative to that in which they were in the situation shown in FIG. 4B.

In FIG. 4D, the fourth processing station 4*d* is completing the process for processing the first and the second units 4*a*, 4*b*, whilst the third unit 4*c* is waiting at its inlet and the fourth unit 4*d* is processed by the third processing station 4*c*.

In FIG. 4E, the first and the second units 4*a*, 4*b* are extracted from the fourth processing station 2*d* and are moved, respectively, inside the sixth processing station 4*e* and waiting at its inlet, whilst the third and the fourth units 4*c*, 4*d* start to be processed simultaneously inside the fourth processing station 2*d*.

Lastly, in FIG. 4F, the first unit 4*a* has completed the production process, so that the respective capsule bodies can be extracted and the unit 4*a* will then be moved to the start of the processing path.

At the same time, the second unit 4*b* is processed inside the sixth processing station, whilst the third and the fourth units 4*c*, 4*d* finish being processed inside the fourth processing station 2*d*.

According to another aspect, upstream of said second processing station, relative to said processing path, there is a first buffer zone configured to house at least one unit 4 not being processed.

According to yet another aspect, downstream of said second processing station and upstream of at least a first processing station 2*a*, 2*b*, 2*c*, 2*e*, relative to said processing path, there is a second buffer zone for housing at least one unit 4 not being processed.

Advantageously, the invention achieves the preset aims overcoming the drawbacks of the prior art by providing the user with a method for making capsules which makes it possible to optimise the management of the resources available, in particular with respect to the use of machine time of the various processing stations 2.

The invention claimed is:

1. A machine for producing capsules containing a powder product, comprising:

a plurality of processing stations, each configured to perform a respective process in producing capsules containing powder product, each respective process having a corresponding predetermined processing time;

a transport system configured to move said capsules along a processing path extending through the plurality of processing stations;

a control unit operatively connected to the transport system;

wherein said transport system comprises a plurality of transport units, each configured to magnetically interact with at least one guide rail extending along the processing path to define a linear motor arrangement, wherein each of the transport units is independently movable along the processing path relative to all others of the transport units;

wherein said plurality of processing stations comprises a first processing station configured for dosing and filling a capsule body with the powder product, the dosing and filling requiring a first predetermined processing time, and a second processing station, positioned downstream of the first processing station and configured for sealing a lid onto the capsule body containing the powder product, the sealing requiring a second predetermined processing time longer than said first predetermined processing time, wherein said control unit is programmed to independently control movement of the transport units, such that a first predetermined number of said transport units is directed to said first processing station for the dosing and filing concurrently, and a second predetermined number of said transport units, greater than said first predetermined number, is directed to said second processing station for the sealing concurrently, wherein each of said transport units is configured to individually receive and support at least one capsule body, the at least one capsule body having a generally frustoconical, hollow shape.

2. The machine according to claim 1, wherein the second predetermined number of the transport units directed to said second processing station by the control unit is twice the first predetermined number of the transport units directed to said first processing station.

3. The machine according to claim 1, further comprising a first buffer zone positioned upstream of said second processing station, relative to said processing path, the first buffer zone being configured to station at least one of the transport units temporarily.

4. The machine according to claim 1, further comprising a second buffer zone positioned downstream of said second processing station and upstream of at least the first processing station, relative to the processing path, the second buffer zone being configured to station at least one of the transport units temporarily.

5. The machine according to claim 1, wherein the guide rail defines a closed processing path comprising an outward section extending along the plurality of processing stations and a return section.

6. The machine according to claim 5, wherein the transport system comprises:

a first guide rail defining the outward section positioned along the plurality of processing stations on the processing path;

a second guide rail defining the return section; and at least one actuator device configured for moving the transport units between the first and second guide rails.

7. The machine according to claim 6, wherein the at least one actuator device comprises a first robotic arm positioned at a first end of said outward section and a second robotic arm positioned at a second end of said outward section.

8. The machine according to claim 5, wherein said return section is positioned below the outward section.

9. The machine according to claim 1, wherein the at least one capsule body includes a plurality of capsule bodies and wherein each of said transport units is configured to receive the plurality of capsule bodies.

10. A method for producing capsules containing powder product, comprising the steps of:

conveying, in a mutually independent manner, a plurality of transport units along a processing path extending through a plurality of processing stations, wherein each of the transport units magnetically interacts with at least one guide rail to define a linear motor arrangement, and wherein each of the transport units is independently movable along the processing path relative to all other of the transport units;

placing the at least one capsule body having a generally frustoconical, hollow shape onto each of the transport units;

dosing and filling the capsule body with the powder product at a first processing station, the dosing and filling process requiring a first predetermined processing time;

sealing a closing lid to the at least one capsule body filled with the powder product at a second processing station positioned downstream of the first processing station, the sealing process requiring a second predetermined processing time longer than the first predetermined processing time;

controlling the conveyance of the transport units such that a greater number of transport units are directed to the dosing and filling station for the dosing and filing concurrently, than to the sealing station for the sealing concurrently.

11. The method according to claim 10, wherein the number of transport units subjected to processing at each of said processing stations differs from the number of transport units subjected to processing at at least one other of said processing stations, the number being determined as a function of a predetermined processing time required of the respective processing station.

12. The method according to claim 10, further comprising the steps of:

unloading each capsule body from the transport units at an end section of the processing path; and returning the transport units from the end section to an initial section of the processing path.

13. The method according to claim 10, further comprising at least one of the following steps:

inserting an insert inside the capsule body at an inserting processing station; and/or weighing the at least one capsule body at a weighing processing station.

14. The method according to claim 13, wherein said insert comprises a filter material.

15. The method according to claim 10, wherein the at least one capsule body includes a plurality of capsule bodies and wherein each of said transport units is configured to receive the plurality of capsule bodies.

* * * * *